US011402814B2

(12) United States Patent
Shah et al.

(10) Patent No.: US 11,402,814 B2
(45) Date of Patent: Aug. 2, 2022

(54) INTERACTIVE HOME SYSTEM INCLUDING WIRELESS DEVICES

(71) Applicant: Capital One Services, LLC, McLean, VA (US)

(72) Inventors: Salik Shah, Washington, DC (US); Sophie Bermudez, Washington, DC (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 197 days.

(21) Appl. No.: 16/855,255

(22) Filed: Apr. 22, 2020

(65) Prior Publication Data

US 2021/0333769 A1 Oct. 28, 2021

(51) Int. Cl.
| G05B 19/042 | (2006.01) |
| H04L 9/40 | (2022.01) |
| G06Q 20/34 | (2012.01) |
| G06K 19/07 | (2006.01) |
| G06Q 20/30 | (2012.01) |

(52) U.S. Cl.
CPC ....... *G05B 19/042* (2013.01); *G06K 19/0723* (2013.01); *G06Q 20/342* (2013.01); *G06Q 20/3415* (2013.01); *G06Q 20/352* (2013.01); *H04L 63/0823* (2013.01); *H04L 63/0853* (2013.01); *G05B 2219/2642* (2013.01); *G06Q 20/308* (2020.05)

(58) Field of Classification Search
CPC ............. G05B 19/042; G06K 19/0723; G06Q 20/3415
USPC .......................................................... 700/275
See application file for complete search history.

(56) References Cited

U.S. PATENT DOCUMENTS

| 7,558,561 | B1 | 7/2009 | Debaty et al. |
| 7,827,581 | B1 * | 11/2010 | Eiger ................... H04B 7/1858 725/81 |
| 7,912,447 | B2 * | 3/2011 | Bennett, III ........ H04L 12/2825 455/404.1 |
| 8,424,048 | B1 | 4/2013 | Lyren et al. |
| 8,706,808 | B2 | 4/2014 | Sanghavi et al. |
| 8,918,333 | B2 | 12/2014 | Harb |
| 9,852,375 | B2 | 12/2017 | Sanjay et al. |
| 10,122,756 | B1 * | 11/2018 | Kelly ................. G06Q 20/3276 |
| 11,212,566 | B1 * | 12/2021 | Swinson .............. H04N 21/812 |
| 2008/0180352 | A1 | 7/2008 | Modir et al. |
| 2008/0222262 | A1 | 9/2008 | Oh et al. |
| 2008/0300985 | A1 | 12/2008 | Shamp et al. |
| 2008/0320078 | A1 | 12/2008 | Feldman et al. |
| 2009/0144159 | A1 | 6/2009 | Bashyam |
| 2010/0007504 | A1 * | 1/2010 | Miyabayashi ..... G06K 7/10128 340/600 |

(Continued)

*Primary Examiner* — Allyson N Trail
(74) *Attorney, Agent, or Firm* — Hunton Andrews Kurth LLP

(57) ABSTRACT

A home system can include a central control unit, which can be paired with a plurality of accessory devices including a client device. The client device can receive an instruction signal from a contactless card. An application of the client device can process the instruction signal and generate an event signal. The client device can transmit the event signal to the central control unit and the central control unit can transmit a device signal to one or more of the accessory devices. The device signal can instruct the one or more accessory devices to perform one or more tasks.

20 Claims, 10 Drawing Sheets

(56) References Cited

U.S. PATENT DOCUMENTS

| | | |
|---|---|---|
| 2011/0145581 A1 | 6/2011 | Malhotra et al. |
| 2013/0148024 A1* | 6/2013 | Shin .................... G06Q 20/306 |
| | | 348/552 |
| 2014/0046775 A1 | 2/2014 | Harb |
| 2014/0123012 A1 | 5/2014 | Adams |
| 2014/0129676 A1 | 5/2014 | Zeng et al. |
| 2014/0211960 A1 | 7/2014 | Dowdy et al. |
| 2015/0095425 A1 | 4/2015 | Thor, Jr. |
| 2015/0149285 A1 | 5/2015 | Schroeter |
| 2015/0161669 A1 | 6/2015 | Raffa et al. |
| 2016/0014474 A1 | 1/2016 | Lee |
| 2016/0125476 A1 | 5/2016 | Stewart |
| 2016/0142995 A1 | 5/2016 | Shuster |
| 2016/0170959 A1* | 6/2016 | Niles .................... G06F 40/263 |
| | | 713/100 |
| 2016/0203521 A1 | 7/2016 | Cho et al. |
| 2016/0364811 A1 | 12/2016 | Chen |
| 2017/0006026 A1* | 1/2017 | An .......................... H04L 63/10 |
| 2017/0017985 A1 | 1/2017 | Stacy |
| 2017/0272316 A1* | 9/2017 | Johnson ............... G06Q 10/103 |
| 2018/0040024 A1 | 2/2018 | Williams, IV |
| 2018/0184177 A1* | 6/2018 | Beals ................. H04N 21/2351 |
| 2018/0309786 A1* | 10/2018 | Apelewicz .............. H04L 67/12 |
| 2019/0075200 A1* | 3/2019 | Seo ..................... G06F 3/04883 |
| 2019/0236208 A1* | 8/2019 | Lee .......................... G10L 25/51 |
| 2020/0064007 A1* | 2/2020 | Escapa ................ H04L 12/2803 |
| 2021/0167958 A1* | 6/2021 | Soriente ................ H04L 9/3263 |
| 2021/0280052 A1* | 9/2021 | Courtney ................ G08C 17/02 |
| 2021/0314064 A1* | 10/2021 | Cromarty ........... H04B 10/1149 |
| 2021/0333769 A1* | 10/2021 | Shah .................. G06K 19/0723 |
| 2021/0409240 A1* | 12/2021 | Li ....................... H04L 12/2814 |

\* cited by examiner

INTERACTIVE HOME SYSTEM INCLUDING WIRELESS DEVICES

BACKGROUND

A contactless card is a physical electronic authorization device, used to control access to a resource. It is typically a plastic card the size of a credit card with an embedded integrated circuit. A contactless card does not require physical contact between the card and reader. Some contactless cards include a pattern of metal contacts to electrically connect to the internal chip.

SUMMARY

With the advent of technologies such as the Internet of things, many of the household devices and appliances are connected to a home network. Some homes include home assistant devices which enable interaction with these devices and appliances. However, contactless cards have not been integrated in home networks. As such, it is an object of this disclosure to describe a system which integrates contactless cards in home networks.

In one example embodiment of the present disclosure, a home system is described. The home system can include a central control unit, which can be paired with a plurality of accessory devices including a client device. The client device can receive an instruction signal from a contactless card. An application of the client device can process the instruction signal and generate an event signal. The client device can transmit the event signal to the central control unit and the central control unit can transmit a device signal to one or more of the accessory devices. The device signal can instruct the one or more accessory devices to perform one or more tasks.

In one example embodiment, the contactless card can provide the instruction signal to the central control unit, e.g., through NFC protocol. Based on the instruction signal, the central control unit can transmit a device signal to one or more of the accessory devices. The device signal can instruct the one or more accessory devices to perform one or more tasks. In yet another example embodiment, the contactless card can provide the instruction signal to one or more accessory devices, e.g., through NFC protocol. The instruction signal can instruct the one or more accessory devices to perform one or more tasks.

In one example embodiment, the accessory devices can include a smart light, a television, a speaker, a client device, an input device, a smart vacuum and a drone. As one example, the device signal (or instruction signal) can command the smart light to flash according to a predetermined pattern. As another example, the device signal (instruction signal) can command the television or the speaker to play a song from the Internet. As yet another example, the device signal (or instruction signal) can command the vacuum to move around in a random pattern and the drone to fly in a dancing pattern.

In one example embodiment, the client device can directly transmit the device signal to the one or more accessory devices. For example, upon receiving an instruction signal from the contactless card, the client device can generate and transmit the device signal to the one or more accessory devices. Using the device signal, the one or more accessory devices can perform a task specified by the device signal, e.g., flash the smart light.

In one example embodiment, in addition to the device signal (or instruction signal), an accessory device can receive an input signal from another accessory device, the central control unit or the client device. The input signal can customize or modify the accessory device's response to the device signal (or instruction signal). For example, a user can scan a contactless card at a smart light. The smart card can also receive an input signal from a camera installed at the home. The input signal can indicate a gesture pattern for the user. The smart card can flash according to a pattern determined based on the instruction signal received from the contactless card and the input signal received from the camera.

DETAILED DESCRIPTION

A home system according to an example embodiment of the present disclosure can include several components. For example, the home system can include a central control unit. The system can also include various accessory devices in communication with the central control unit. Examples of these accessory devices can include cameras, lights, household appliances, and other devices which can interact with the central control unit via a wireless communication interface.

Figure 1:
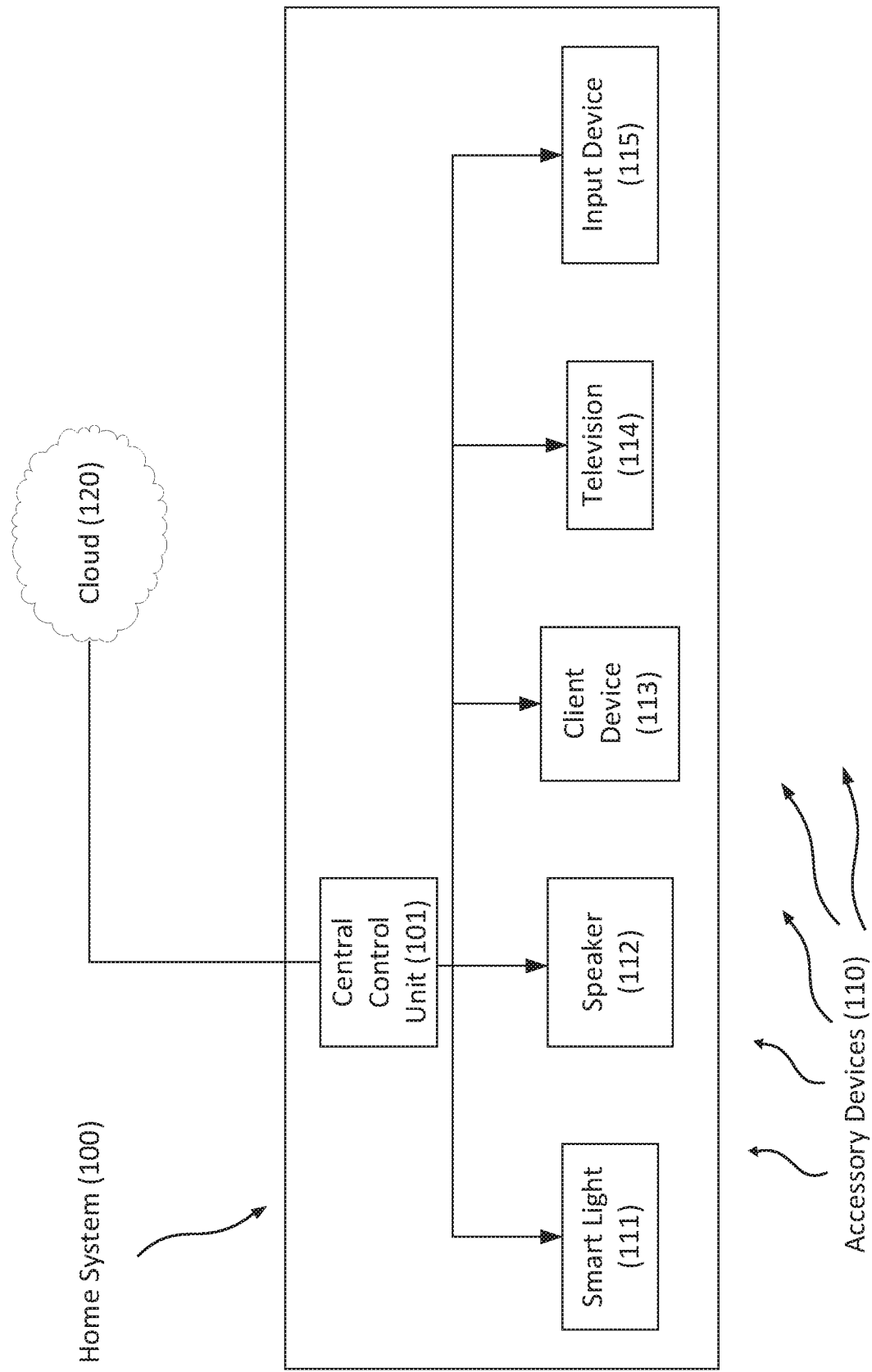
FIG. 1 shows a home system according to an example embodiment.

FIG. 1 shows a home system 100 according to an example embodiment. In this example embodiment, the home system includes a central control unit 101 and various accessory devices 110 such as a smart light 111, a speaker 112, a client device 113, a television 114 and an input device 115. The central control unit 101 can be in wireless communication with these accessory devices 110. For example, the central control unit 101 can be paired with these accessory devices 110. The central control unit can also be in communication with a cloud 120 or a server of a service provider. The central control unit 101 can exchange data, commands and files with the cloud 120 and the accessory devices 110. In one example embodiment, the accessory devices can be paired with one another and/or the accessory devices can communicate with one another, e.g., can exchange data, commands and files with one another.

The central control unit 101 can include a housing, a power supply, processing circuitry, a transceiver, and an antenna. The processing circuitry can include a processor and a memory. The memory of the processing circuitry can store a firmware which when executed by the processor can control various functional aspects of the central control unit 101 and the accessories connected to (or in communication with) the central control unit.

The firmware of the central control unit 101 can include a module for controlling the transceiver. The transceiver can operate with radio, cellular, CAT-M cellular, Wi-Fi, Bluetooth and communication frequencies or protocols. The module can enable the central control unit 101 to receive and transmit data, signals and media files. The firmware can include a module for communication with a network such as the Internet. Using this module, the firmware can be in communication with a server (or the cloud 120) and exchange data and files with the server. The firmware can also include a module for communication with accessory devices, e.g., the accessory devices 110.

In some embodiments, the accessory devices 110 can be wirelessly connected to the central control unit 101, i.e., the module of the firmware can exchange data, signals or media files with each accessory device using a wireless communication protocol. In these embodiments, the user can pair an accessory device with the central control unit 101 or the accessory device can by synced with the central control unit 101.

The central control unit can receive data and commands from various accessory devices, and the central control unit can transmit data and commands to these accessory devices. For example, an accessory device such as a client device can detect a contactless card, and in response, transmit a signal to the central control unit. In response, the central control unit can trigger an action by, e.g., an accessory device such as a smart light, a speaker or a television.

Pairing the central control unit with an accessory device can establish an initial bonding between the central control unit and the accessory device so that communication is allowed and facilitated between the two devices. In an example embodiment, the central control unit can use Bluetooth wireless technology standard or Wi-Fi technology standard for exchanging data and communication between the central control unit and the accessory device. Use of other wireless technology standards such as cellular wireless, CAT-M cellular, Induction Wireless, Infrared Wireless, Ultra Wideband, ZigBee, or a combination thereof is also conceivable.

In one embodiment, the central control unit and the accessory device can be paired through a network such as the Internet. For example, each of the central control unit and the accessory device can connect to the Internet through a wireless connection or via a router or hub, and thus, the central control unit can exchange data and communicate with the accessory device using the Internet.

Although in some example embodiments the client device transmits an event signal to the central control unit, and in response, the central control unit transmits a device signal to the accessory devices to perform a task, one of ordinary skill in the art recognizes that in a home system, a client device can serve as a central control unit. Therefore, in one example embodiment, upon transmission of an instruction signal from the contactless card to the client device, the client device can transmit a device signal to one or more accessory devices to require each respective device to perform at least one task. In this example embodiment, the central control unit is optional, and the client device can perform all the functions of the central control unit. For example, the client device can generate the device signal for television to look up a song on the Internet and play the song. The song can be marked as favorite on the client device by the user.

Although in some example embodiments the client device transmits an event signal to the central control unit based on an instruction signal received from the contactless card, and in response, the central control unit transmits a device signal to the accessory devices to perform a task, one of ordinary skill in the art recognizes that in a home system, a contactless card can be scanned at the central control unit or the accessory device. As such, the contactless card can send an instruction signal to the central control unit, and in response, the central control unit can send a device signal to the accessory device. Similarly, the contactless card can directly send a signal to the accessory device to perform the tasks.

In one example embodiment, a user can scan a contactless card at a client device, and in response, the client device can trigger an action at the home system, e.g., the home system can flash the smart lights or the home system can instruct a speaker to play a favorite music. The contactless card can be a gift card, credit card, debit card, or any similar card. In one example embodiment, when scanned at the client device, the contactless card can transmit an instruction signal to the client device, and based on the instruction signal, the client device can trigger different actions at the home system. In one example embodiment, the contactless card can transmit the same instruction signal every time the contactless card is scanned at a client device. In other embodiments, the contactless card can change the instruction signal each time that the card is scanned at the client device, e.g., the card can include a counter module which can modify the instruction signal using the counter module.

The size of the contactless card can be defined according to ID-1 of the ISO/IEC 7810 standard, e.g., the dimensions of the contactless card can be 85.60 by 53.98 millimeters (3.37 in×2.13 in). However, a contactless card according to these disclosures can have a different size, and it is not necessary for a contactless card to be implemented in a payment card.

A contactless card can include processing circuitry for storing and processing information. The processing circuitry can include processors, memories, error and parity/CRC checkers, data encoders, anticollision algorithms, controllers, command decoders, security primitives and tamper-proofing hardware.

The storage of information can take place in a memory of the processing circuitry, which can be a read-only memory, write-once read-multiple memory or read/write memory, e.g., RAM, ROM and EEPROM. A contactless card can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory of a contactless card can be divided into several zones, each provided with a different level of security. The contactless card processor can keep track of which memory addresses belong to which zones and the circumstances under which each zone can be accessed. A contactless card processor can also process information and store the information onto the memory. In an example embodiment, a contactless card memory can be divided into four zones: a secret zone, a confidential zone, a usage zone, and a public zone.

A secret zone can be used for storage of information which can be used only by the processor itself, e.g., passwords, cryptographic keys. The information stored in this zone is not readable outside of the contactless card. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

In an example embodiment, the contactless card can be a JavaCard which can include one or more applets. The applets can be firewalled, and data can be allocated to the applet for storage. The data can be stored transactionally in an EEPROM flash memory, e.g., if the write isn't complete when the power is removed, the contents remain the same as before.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified.

A usage zone could be used for storage of information which can be periodically updated or modified. Depending on the sensitivity of the data, a password can be implemented for this zone. The usage zone can have both read and write access protected by a password.

A public zone can be used for keeping nonsensitive information, such as the card issuer's name and address. The public zone can have read-only access, without a password.

In one example embodiment, the memory of the contactless card can store a plurality of instruction signals for transmission when the card is scanned at a client device. The plurality of instruction signals can be stored in any of the memory zones of the contactless card.

A contactless card can wirelessly communicate with a client device. For example, a contactless card can be a gift card including a magnetic tape or a radio-frequency identification ("RFID") tag. Some contactless cards can include both the magnetic tape and the RFID tag.

A client device can communicate with a contactless card if the contactless card is held in proximity to the client device. The terminal can read the contactless card over a short distance using near-field communication ("NFC") technology, which uses radio frequency induction. A contactless card can include an inductor to capture some of the incident radio-frequency interrogation signals transmitted by the client device, rectify it, and use it to power the card's processing circuitry. As such, contactless cards can function without an internal power source. However, in some embodiments, contactless cards can include an internal power source.

The contactless card can be EMV-compliant. Europay, MasterCard and Visa ("EMV") is a payment method based upon a technical standard for smart payment cards. EMV cards can store their data on integrated circuits in addition to magnetic stripes. The standard for contact cards can be based on ISO/IEC 7816, and the standard for contactless card can be based on ISO/IEC 14443.

Figure 2:
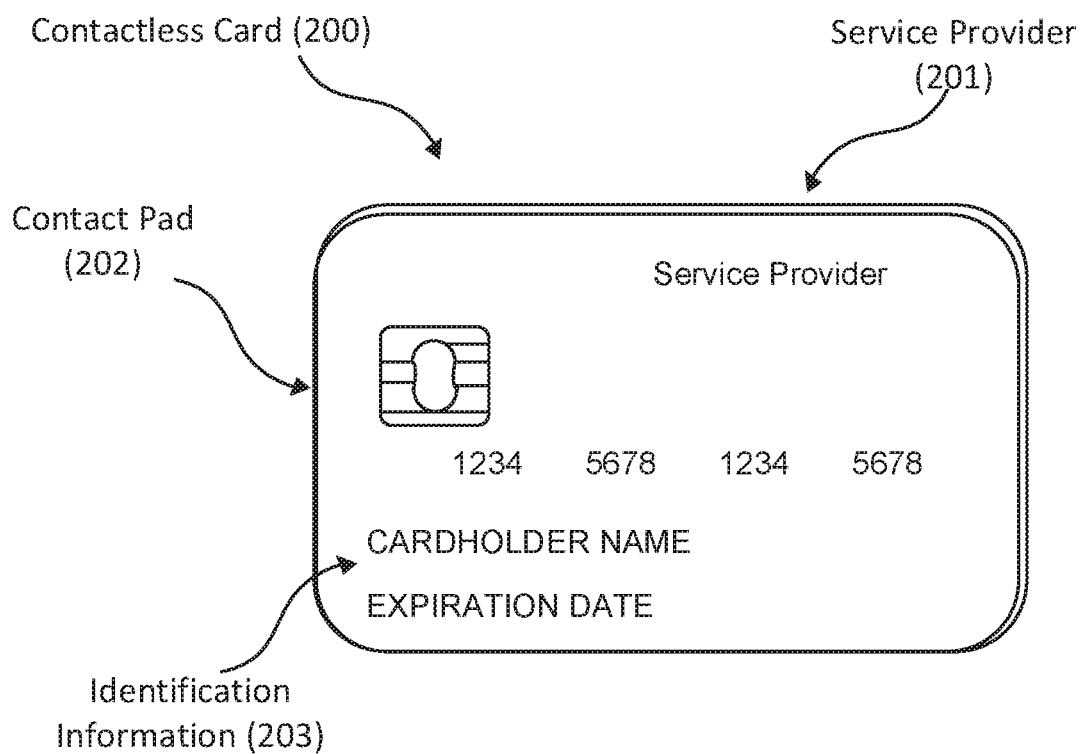
FIG. 2 illustrates a contactless card according to an example embodiment.

FIG. 2 illustrates a contactless card 200 according to an example embodiment. In this embodiment, the contactless card 200 can be a gift card issued by a service provider 201, the name of which can be displayed on the front or back of the contactless card 200. The size of the contactless card 200 can be compliant with ID-1 of the ISO/IEC 7810 standard, i.e., 85.60 by 53.98 millimeters. The contactless card 200 can include a contact pad 202 for establishing contact with a contact terminal. The contactless card 200 can also include processing circuitry, antenna and other components not displayed in FIG. 2. These components can be located behind the contact pad 202. The contactless card 200 can also include identification information 203 displayed on front or back of the card. The contactless card 200 can also include a magnetic strip or tape, which can be located on the back of the card.

In an example embodiment, the contactless card is provided with a radio-frequency identification ("RFID") tag. In some embodiments, the RFID tag can include processing circuitry for storing and processing information that modulates and demodulates a radio-frequency signal (usually received from a client device, terminal, reader/writer or scanner). An RFID tag can also include an antenna for receiving and transmitting the signal. Additionally, an RFID tag can include a power source or means for collecting DC power from the incident client device signal. These means can include modulators, voltage regulators, resets, and connections to an antenna. The antenna can be an electric dipole antenna or a coil antenna.

In an example embodiment, the coil of a contactless card can act as the secondary of an air core transformer. The client device can communicate with the contactless card by cutting power or amplitude modulation. The contactless card can infer the data transmitted from the client device using the gaps in the contactless card's power connection, which is functionally maintained through capacitors. The contactless card can communicate back by switching a load on the contactless card's coil or load modulation. Load modulation can be detected in the client device's coil through interference.

An accessory device can be a television 114, a smart light 111, a speaker 112, a client device 113, a camera or similar devices, which can receive a device signal form the central control unit 101 to trigger an event, e.g., show a video clip on the television, dim or flash the lightbulb, play a favorite music on the speaker, display a popup window on a client device connected to the home system, or instruct a camera to record.

Each accessory device can include a housing, a power supply, processing circuitry, a transceiver, and an antenna. The processing circuitry can include a processor and a memory. The memory of the processing circuitry can store a firmware which when executed by the processor can control various functional aspects of the accessory device. The firmware of the accessory device can include a module for controlling the transceiver. The transceiver can receive a device signal from the central control unit (or an instruction signal from a contactless card) and execute a task according to the device signal (or the instruction signal).

In an example embodiment, a smart light can be an accessory device in communication with the central control unit. The smart light can include a wireless communication interface and the central control unit can communicate with the smart light, e.g., the central control unit can be paired with the smart light and transmit a device signal to the smart light. In response, the smart light can perform an action based on the device signal. For example, the central control unit can command the smart light to turn on and off (e.g., flash). As another example, the central control unit can command the smart light to flash for a period of time. As yet another example embodiment, the central control unit can command the smart light to change the color or intensity of the light emitted by the smart light. As yet another example, the central control unit can command the smart light to flash using changing colors according to a pattern.

In an example embodiment, the smart light can be a device including lights coupled to a controller which has a transceiver and a switch. For example, a Christmas tree includes a plurality of lights. The lights of the Christmas tree can be coupled to a controller connected to the home system. The home system, through the central control unit, can transmit a signal to the controller to have the Christmas tree lights flash according to a particular pattern.

In an example embodiment, a speaker or a television can be an accessory device in communication with the central control unit. For example, the speaker 112 or the television 114 can be paired with the central control unit 101 and the central control unit 101 can transmit device signals, commands or media files to these devices. If the client device triggers an event, the central control unit can transmit a device signal to the speaker 112 or the television 114 to generate an event, e.g., playing a predetermined sound, music or video. In one example embodiment, the client device 113 or the central control unit 101 can transmit a media file (or link to a media file) to the speaker 112 or the television 114, e.g., the client device 113 can send a photo to central control unit 101, which can relay the photo to the television 114 for displaying. As another example, the central control unit 101 can send a link to a song to the speaker 112, which can download the song form the Internet and play the song.

In an example embodiment, the speaker 112 can be a device with an integrated virtual assistant that can offer interactive actions and handsfree activation. The speaker 112 can include a wireless communication interface compatible with Wi-Fi, Bluetooth or other wireless protocol standards. Using the speaker 112, the user can achieve many of the same functionalities that the user can accomplish using the application of the client device. In an example embodiment, the user can speak a command to the speaker 112, and in response, the speaker 112 can transmit a signal to the central control unit 101. The signal can be similar to the signals that the application of the client device 113 can transmit to the central control unit 101. For example, the user can speak a command to turn the smart light 111 on and the speaker 112 can transmit a signal to the central control unit 101 to turn the smart light 111 on.

In an example embodiment, the central control unit can be paired with consumer electronics, which can perform a task in response to receiving a device signal. For example, the central control unit can be paired with a device that has a speaker or a display screen, e.g., telephone, cell phone, laptops, desktop computer. When the client device transmits an event signal to the central control unit, the central control unit can use the device as a speaker or display screen (e.g., by sending a device signal). The central control unit can also have a specific image displayed on the device when the central control unit sends the device signal to the device.

In an example embodiment, the central control unit can be paired with a device with wireless communication capability, and the device can perform a task. For example, the central control unit can be paired with a vacuum or a toy such as a drone, and when the central control unit receive an event signal, the central control unit can transmit a device signal to the vacuum or the drone. Using the device signal, the vacuum can, e.g., move in a dance liked manner or the drone can operate according to a predetermined mode of operation, e.g., flying up and down.

In an example embodiment, a camera can be an accessory device in communication with the central control unit. The camera can be a standalone camera or it can be a camera included in another device, e.g., client device, cellphone, laptop, tracker, wearable device, etc. The camera can record a photo, video, media file, or other type of file ("data") and transmit the data to the central control unit. The camera can also stream videos to the central control unit.

In an example embodiment, the camera can be in a living room or a similar place. Upon receiving a device signal, the camera can begin recording and stream the video to the central control unit. The central control unit can analyze the incoming images (or the central control unit can transmit the incoming images to the cloud for analysis). The central control unit can transmit the video to a social media platform. The central control unit can also include a database of familiar faces and identify the faces of the individuals in the video. The central control unit can tag the video with the names of the individuals identified in the video. The central control unit send the tagged names to the social media platform for further tagging and publishing of the video.

Figure 3:
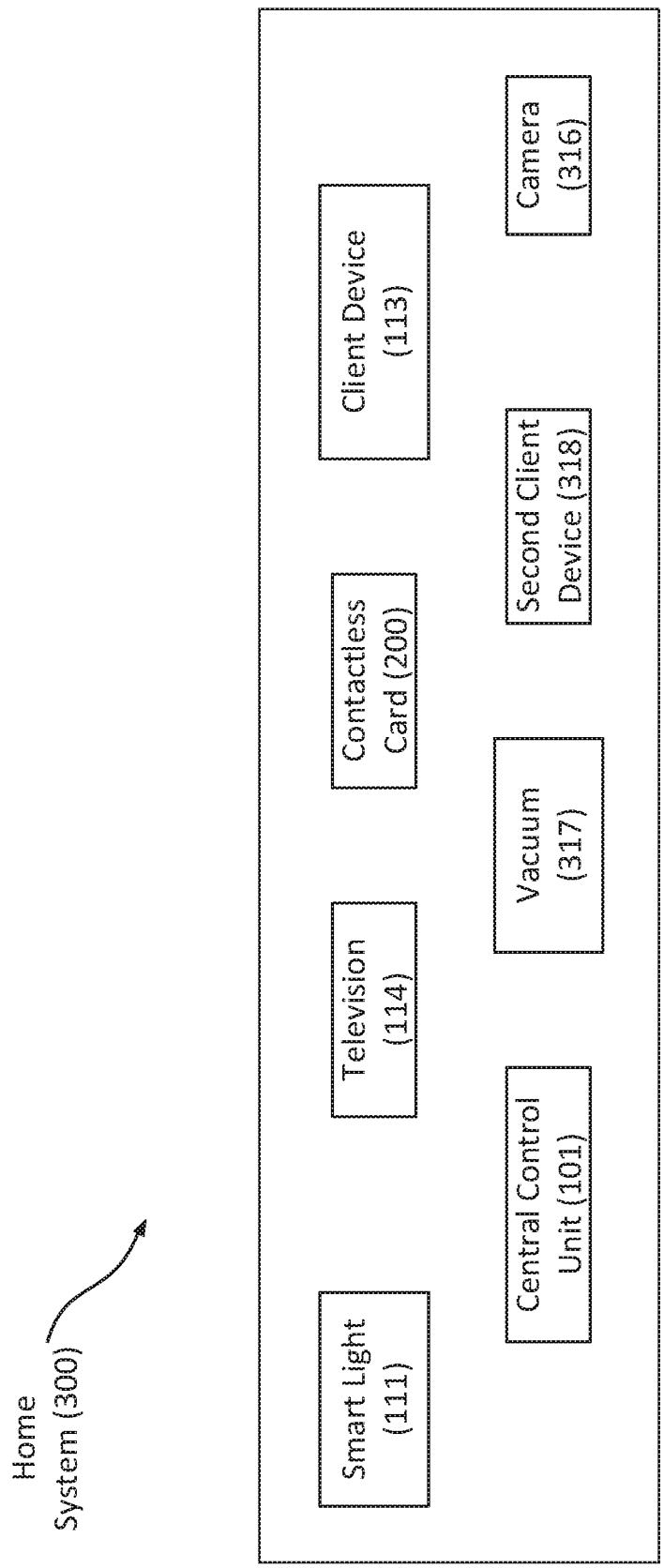
FIG. 3 shows a home system including a plurality of accessory devices according to an example embodiment.

FIG. 3 shows a home system 300 including a plurality of accessory devices according to an example embodiment. In this example embodiment, the home system 300 can include a central control unit 101, which is connected to a plurality of accessory devices. These accessory devices include the smart light 111, the client device 113, the television 114, a camera 316 and a vacuum 317. A user can scan the contactless card 200 at the client device 113. The contactless card can include a static instruction or a dynamic instruction for the client device. The static instruction can cause the contactless card 200 to transmit the same instruction signal to the client device each time the contactless card is scanned at a client device. However, the dynamic instruction can cause the contactless card 200 to transmit a different instruction signal each time the contactless card 200 is scanned at a client device, e.g., the number of times the contactless card 200 is scanned can determine the instruction signal because the contactless card 200 includes a counter module.

In one example embodiment, a user can scan the contactless card 200 at the central control unit 101 or one or more of the accessory devices, e.g., television 114. Scanning the contactless card at the central control unit 101 or an accessory device can cause the accessory device to perform a task. For example, scanning the contactless card at an accessory device can transmit a predetermined set of instructions to the accessory device and cause the accessory device to perform a preset task, e.g., the television can open up a particular application and perform a preset task. In one embodiment, if the contactless card is scanned at the television 114, the television 114 can open up a movie rental application, pay for a predetermined movie and cause the television 114 to show the movie. In one example embodiment, the contactless card can be scanned at a refrigerator. The refrigerator can include a list of products that need to be purchased, e.g., milk, eggs, etc. Upon scanning the contactless card at the refrigerator, the refrigerator can transmit a signal to an online retail store to place an order for these products.

In one example embodiment, the instructions transmitted by the contactless card can be customized, modified or changed based on an input signal received from another accessory device or the central control unit. For example, a user can scan a contactless card at an accessory device, e.g., television 114 and the contactless card can instruct the television 114 to play a random video clip. Subsequently, a camera can capture a gesture by the user, e.g., dance move. The camera can identify the user's move as a dance move, and transmit an input signal to the television 114 to specify the video clip to be played on the television 114. For example, because the user's gesture is a dance move, the television 114 can display a dance video clip.

Figure 4A:
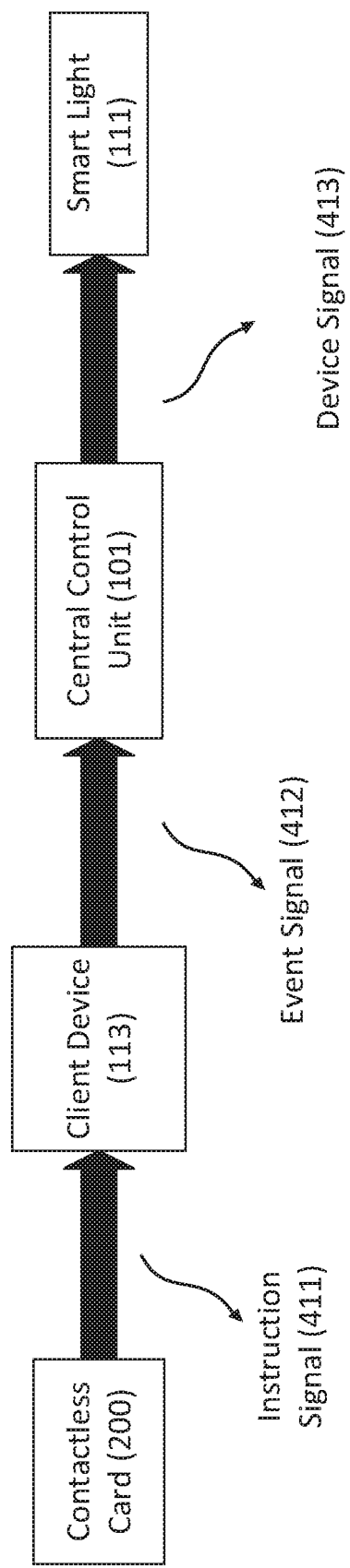
FIGS. 4A-C show a plurality of signals transmitted between the contactless card, client device, central control unit and/or the smart light.

FIG. 4A shows a plurality of signals transmitted between the contactless card 200, the client device 113, the central control unit 101 and the smart light 111. Upon scanning the contactless card 200 at the client device 113, the client device can receive an instruction signal 411 from the contactless card. Based on the instruction signal 411, an application of the client device 113 can transmit an event signal 412 to the central control unit 101. The event signal 412 can cause the central control unit 101 to transmit a device signal to one or more of the accessory devices to perform a task, e.g., flashing the smart light 111 according to a pattern; displaying a video on the television 114, capturing a video using the camera 316 and having the vacuum move in a predetermined pattern.

Figure 4B:
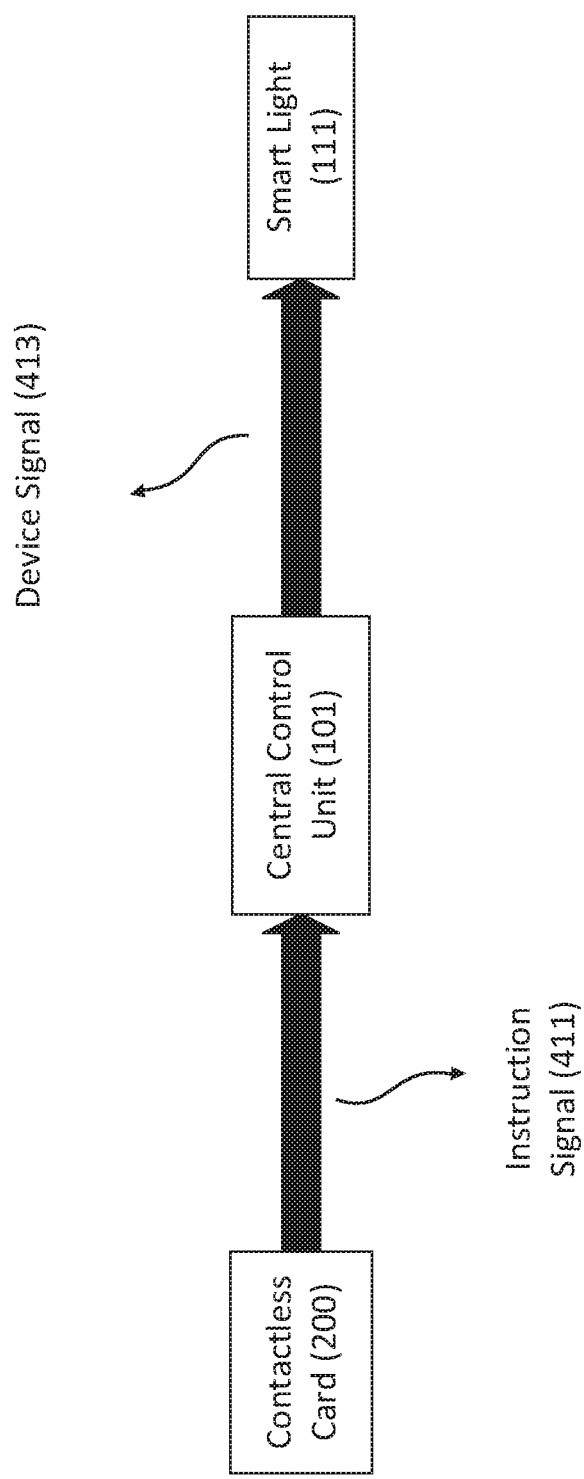
Figure 4C:
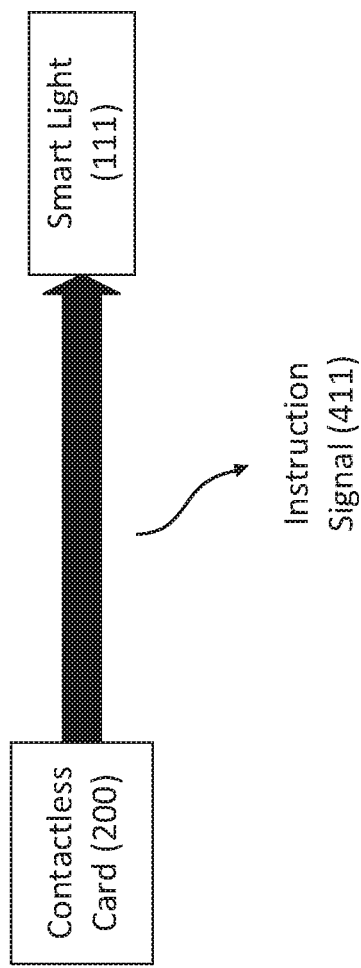

FIG. 4B shows a plurality of signals transmitted between the contactless card 200, the central control unit 101 and the smart light 111. Upon scanning the contactless card 200 at the central control unit 101, the contactless card 200 transmits an instruction signal 411 to the central control unit 101. The instruction signal 411 can cause the central control unit 101 to transmit a device signal to one or more of the accessory devices to perform a task. FIG. 4C shows a plurality of signals transmitted between the contactless card 200 and the smart light 111. Upon scanning the contactless card 200 at the accessory device, the contactless card 200 transmits an instruction signal 411 to the accessory, which causes accessory device to perform a task.

In one example embodiment, a second client device 318 can be paired with the central control unit 101 (FIG. 3). The second client device 318 can also include the application which the client device 113 includes. A user can scan the contactless card 200 at the client device 113, and in response, the client device 113 can transmit an event signal to the central control unit 101, which can transmit a device signal to the second client device 318 to trigger an event. For example, the central control unit 101 can transmit a device signal to the second client device 318 which can cause the second client device 318 to capture a video, flash the flashlight of the client device 318, or display a notification, video, or slideshow.

In an example embodiment, the central control unit can be paired with a client device. The client device can be a smartphone, a cellphone, a laptop, a desktop, a notebook, a tablet, a wearable device, a speaker, or any other similar device. The client device can receive instruction signals from a contactless card. The instruction signals can relate to triggering an event at an accessory device using a home system. For example, the instruction signals can enable the client device to transmit an event signal to the central control unit to require a smart light dim in a room.

The client device can include a software application ("application"), and by scanning the contactless card at the client device, the application can transmit an event signal to the central control unit of the home system. The application can directly transmit the event signal to the central control unit. Alternatively, the client device can transmit a signal to a server, e.g., through the Internet. The server can in turn transmit the signal to the central control unit.

In one example embodiment, the contactless card can store a predetermined instruction (i.e., static instruction) for triggering an event using the central control unit. For example, the contactless card can store an instruction for dimming a smart light. Upon scanning the contactless card at the client device, the contactless card can transmit an instruction signal for dimming the smart light. As another example, the contactless card can store an instruction for playing a favorite song at a speaker of the home system.

Upon scanning the contactless card, the contactless card can send the instruction signal to the client device, and in response, the client device can send an event signal to the central control unit. The event signal can cause the central control unit to send a device signal to the speaker to download the favorite song and play it. As yet another example, the instruction can require a smart light and a speaker to flash light and play a music simultaneously (e.g., music along with a synchronized light show). As yet another example, the instruction can require a vacuum to move or a drone to fly in a particular pattern.

In one example embodiment, the contactless card can store a variable instruction (i.e., dynamic instruction) for triggering an event using the central control unit. For example, the contactless card can store an instruction which can change every time the contactless card is scanned at a client device. In this example, the contactless card can include a counter module which changes every time the contactless card is scanned at a client device. The contactless card can generate the instruction signal using the counter module of the contactless device. As such, each time the contactless card is scanned at a client device, the contactless card transmits a different instruction signal. In one embodiment, the contactless card can include a timer and the contactless card can generate the instruction signal using the timer module.

In one example embodiment, a user of the application of the client device can customize the event signal that the client device transmits to the central control unit. For example, the application can be a banking application of the issuer of a gift card. The application can display a user interface in the client device. The user interface can include a page for customizing the response when an instruction signal from a gift card is received. The page can display a list of accessory devices connected to the home system. For each device, the user can specify whether the central control unit can transmit a device signal to the device to activate the device to perform a task. For some accessory devices, the user can also specify the task to be performed by the accessory device.

Figure 5:
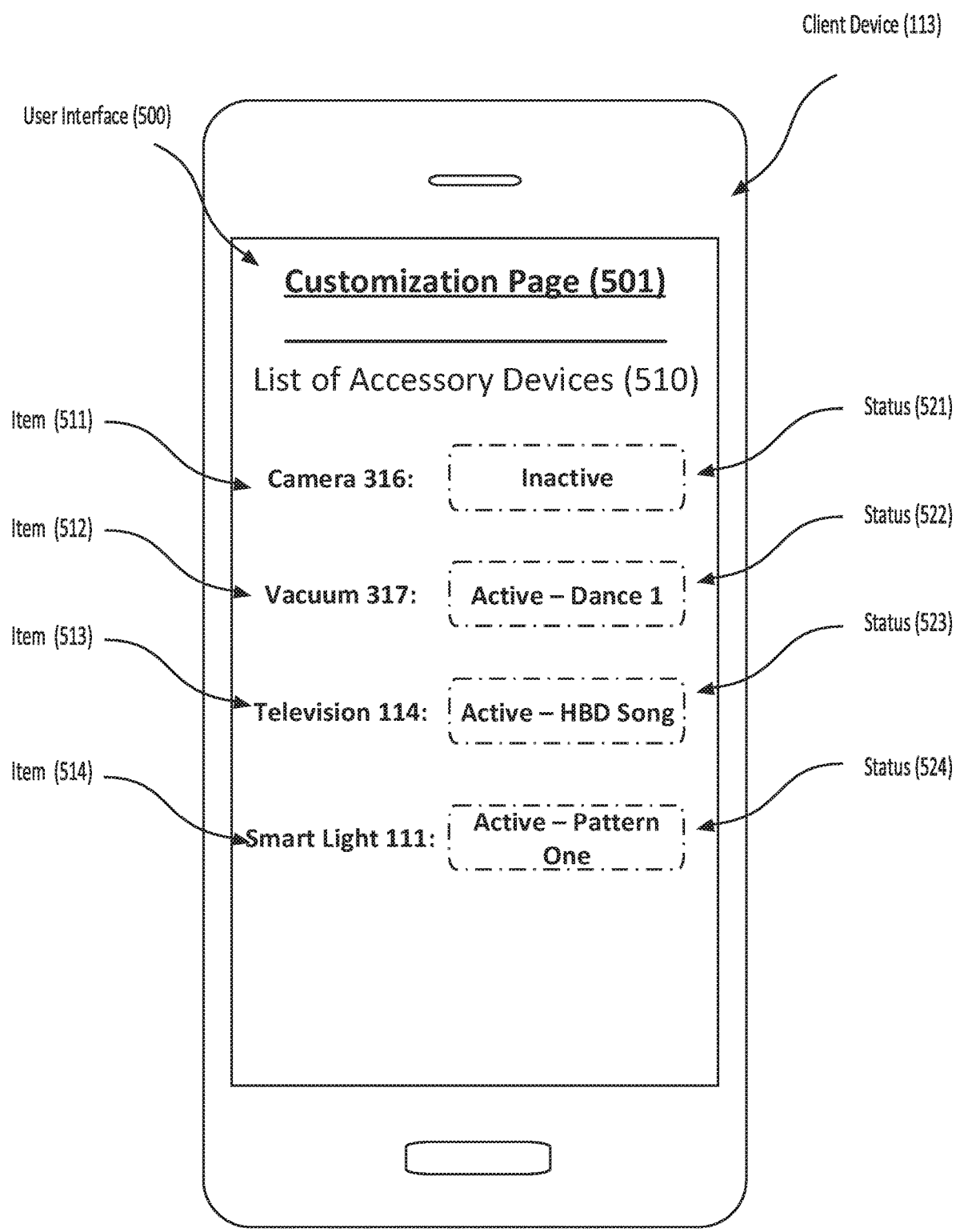
FIG. 5 shows an example customization page displayed in a user interface of the client device.

FIG. 5 shows an example customization page 501 displayed in a user interface 500 of the client device 113. The page 501 can include a list of accessory devices 510. The list can display a plurality of items 511-514 and a plurality of status indicators 521-524 for each respective item. For example, the list 510 can include a camera 316, a vacuum 317, a television 114 and the smart light 111. In this example embodiment, the camera 316 is inactive. However, the vacuum 317, the television 114 and the smart light 111 are active. Moreover, the user has specified a precise task for each device. For example, the user has specified that when an instruction signal is received, the vacuum 317 performs the "Dance 1;" the television 114 displays the "HBD Song;" and the smart light 111 flashes according to "Pattern One."

In one example embodiment, the client device can include a pattern learning algorithm, and the pattern learning algorithm can specify the task to be performed by the accessory device. For example, the client device can learn what song or songs the user plays at night, and if the instruction signal is received at night, the pattern learning algorithm can specify that the application should ask for the song that the user plays at night. The application can use this information to generate the event signal.

Figure 6:
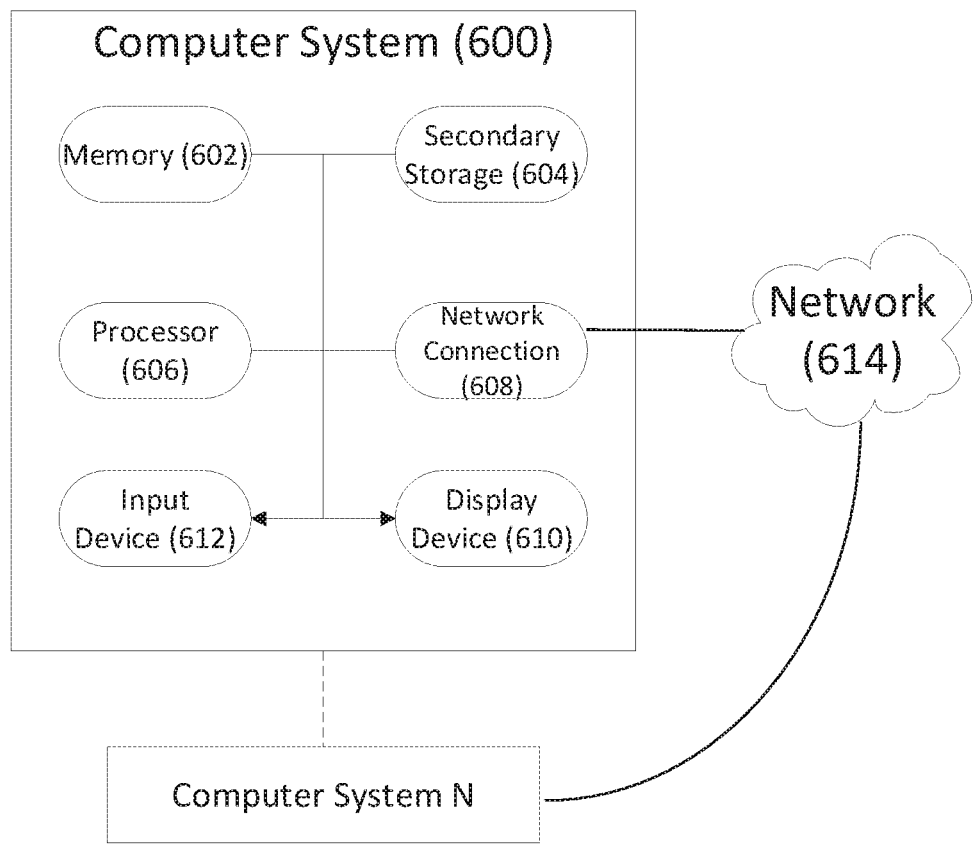
FIG. 6 illustrates exemplary hardware components for a server.

FIG. 6 illustrates exemplary hardware components of a server. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

Figure 7:
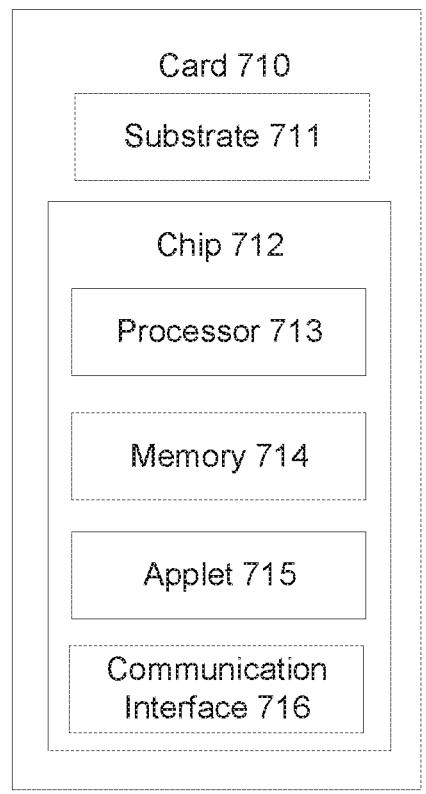
FIG. 7 illustrates a chip card according to an example embodiment.

FIG. 7 illustrates a chip card according to an example embodiment. The card 700 can include a chip 712. The chip 712 can be any type of chip, such as a computer chip or a Europay, Mastercard, Visa (EMV) chip. As shown in FIG. 7, the chip can include a processor 713, a memory 714, an applet 715, and a communication interface 716.

The processor 713 can be a processor, a microprocessor, or other processor, and the card 710 can include one or more of these processors. The processor 713 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 711 can be coupled to the memory 714. The memory 714 can be a read-only memory, write-once read-multiple memory or read/write memory, e.g., RAM, ROM, and EEPROM, and card 710 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it can not be rewritten, but it can be read many times. A read/write memory can be programmed and re-programed many times after leaving the factory. It can also be read many times. The memory 714 can be configured to store one or more software applications and one or more applets, such as applet 715, and other data, such as private information.

The applet 715 can comprise one or more applets (e.g., Java Card applets) and/or one or more software applications comprising instructions for execution on the card 710. In some examples, card 710 can execute one or more applets or one or more applications that enable, for example, network communications with one or more components of system 700, transmit and/or receive data, and perform the functions described herein. Upon execution by the processor 713, the application 715 can provide the functions described in this specification, specifically to execute and perform the steps and functions in the process flows described herein. Such processes can be implemented in software, such as software modules, for execution by computers or other machines. The applet 715 can provide graphic user interfaces (GUIs) through which users can view and interact with other components and devices within system 700. The GUIs can be formatted, for example, as web pages in HyperText Markup Language (HTML), Extensible Markup Language (XML) or in any other suitable form for presentation on a display device depending upon applications used by users to interact with the system 700.

The communication interface 716 can include communication capabilities with physical interfaces and contactless interfaces. For example, the communication interface can communicate with a physical interface, such as by swiping through a card swipe interface or inserting into a card chip reader found on an automated teller machine (ATM) or other device configured to communicate over a physical interface. In other examples, the communication interface 716 can establish contactless communication with a card reading device via a short-range wireless communication method, such as NFC, Bluetooth, Wi-Fi, RFID, and other forms of contactless communication. The communication interface 716 can communicate directly with a user device or communicate with a user device, server, and database via a network.

Figure 8:
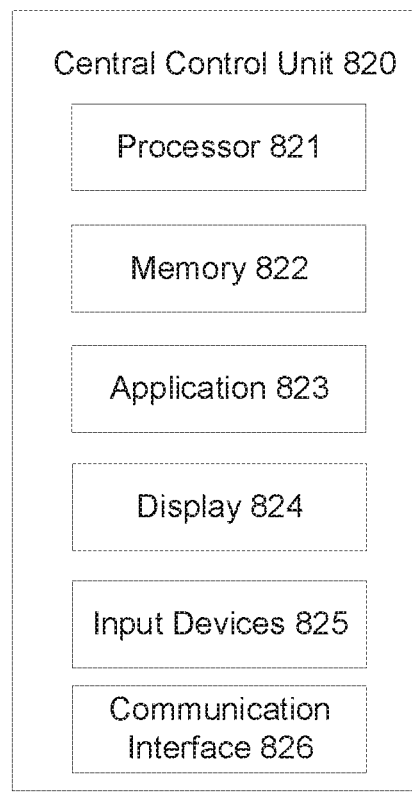
FIG. 8 shows an example central control unit according to an example embodiment.

FIG. 8 shows an example central control unit 120. The central control unit 820 can be a network-enabled computer device. Exemplary network-enabled computer devices include, without limitation, including, a server, a network appliance, a personal computer, a workstation, a phone, a handheld personal computer, a personal digital assistant, a thin client, a fat client, an Internet browser, a mobile device, a kiosk, an automated teller machine (ATM), a cash register, or other a computer device or communications device. For example, network-enabled computer devices can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, the central control unit can be a contact-based card or a contactless card.

The central control unit 820 can include a processor 821, a memory 822, an application 823, a display 824, input devices 825, and a communication interface 826. The processor 821 can be a processor, a microprocessor, or other processor, and the central control unit 805 can include one or more of these processors. The processor 821 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 821 can be coupled to the memory 822. The memory 822 can be a read-only memory, write-once read-multiple memory or read/write memory, e.g., RAM, ROM, and EEPROM, and central control unit can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it can not be rewritten, but it can be read many times. A read/write memory can be programmed and re-programed many times after leaving the factory. It can also be read many times. The memory 822 can be configured to store one or more software applications, such as application 823, and other data, such as private information.

The application 813 can comprise one or more applets or one or more software applications comprising instructions for execution on the central control unit 805. In some examples, central control unit 820 can execute one or more applications, such as software applications, that enable, for example, network communications with one or more components of system 800, transmit and/or receive data, and perform the functions described herein. Upon execution by the processor 821, the application 823 can provide the functions described in this specification, specifically to execute and perform the steps and functions in the process flows described above. Such processes can be implemented in software, such as software modules, for execution by computers or other machines. The application 823 can provide graphic user interfaces (GUIs) through which user can view and interact with other components and devices within the system. The GUIs can be formatted, for example, as web pages in HyperText Markup Language (HTML), Extensible Markup Language (XML) or in any other suitable form for presentation on a display device depending upon applications used by users to interact with the system.

The central control unit 820 can further include a display 824 and input devices 825. The display 824 can be any type of device for presenting visual information such as a computer monitor, a flat panel display, and a mobile device screen, including liquid crystal displays, light-emitting diode displays, plasma panels, and cathode ray tube displays. The input devices 825 can include any device for entering information into the central control unit 820 that is available and supported by the central control unit 820, such as a touch-screen, keyboard, mouse, cursor-control device, touch-screen, microphone, digital camera, video recorder or camcorder. These devices can be used to enter information and interact with the software and other devices described herein.

The communication interface 826 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The central control unit 820 can also support a short-range wireless communication interface, such as NFC, RFID, and Bluetooth, through communication interface 826, along with radio transmissions.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A card system, comprising: a contactless card comprising a processor, a memory, and a contactless communication interface, wherein the memory contains an applet, a first instruction, and a second instruction; a first application comprising instructions for execution on a client device comprising a processor and a contactless communication interface configured to generate a first contactless communication field; and a second application comprising instructions for execution on an accessory device comprising a processor and a contactless communication interface configured to generate a second contactless communication field, wherein the secondary device is in data communication with a camera, wherein, upon entry of the contactless card into the first contactless communication field, the applet is configured to: generate a first instruction signal based on the instruction, and transmit the first instruction signal to the application; wherein, upon receipt of the instruction signal, the application is configured to transmit a first command signal to a smart device; wherein, upon receipt of the first command signal, the smart device performs one or more tasks; wherein upon entry of the contactless card into a second contactless field, the applet is further configured to: generate a second instruction signal based on the second instruction, and transmit the second instruction signal to the accessory device, wherein upon receipt of the second instruction signal to the accessory device, wherein, upon receipt of the second Instruction signal, the second application is configured to transmit a second command signal instructing the camera to record at least one of a photo or a video.

2. The card system of claim 1, wherein the task is to generate a device signal to be transmitted to a second accessory device.

3. The card system of claim 2, wherein the second accessory device is a smart light, a television, a speaker, or a drone.

4. The card system of claim 1, wherein the smart device is a smart light and the task is to change a brightness of the smart light or change a color of a light of the smart light.

5. The card system of claim 1, wherein the smart device is a television and the task is to download or stream a video from the internet and play the video.

6. The card system of claim 1, wherein the smart device is a speaker and the task is to download or stream a song from the internet and play the song.

7. The card system of claim 1, wherein the smart device is a drone and the task is for the drone to fly according to a predetermined pattern.

8. The card system of claim 1, wherein the contactless communication interfaces of the contactless card and the client device are near-field communication (NEC) interfaces.

9. The card system of claim 8, wherein the first instruction signal is an NFC Data Exchange Format message.

10. The card system of claim 1, wherein the applet is configured to request an authentication certificate from the application via the contactless communication interface of the contactless card and transmit the first instruction signal upon receiving the authentication certificate.

11. The card system of claim 10, wherein upon receipt of the authentication certificate, the card generates a message for transmission to the first application.

12. A method, comprising: providing a card comprising a processor, a memory containing a first instruction signal, a second instruction signal, and a communication interface; entering the card into a first communication field; transmitting, via the first communication field, the first instruction signal from the card to first application comprising instructions for execution on a client device comprising a processor, a memory, and a contactless communication interface; transmitting a first command signal from the application to a smart device; adjusting an operation of the smart device in response to receiving the first command signal; entering the card into a second communication field; transmitting, via the first communication field, the second instruction signal from the card to a second application comprising instructions for execution on an accessory device comprising a processor, a memory, and a contactless communication interface; initiating the operation of a camera in response to receiving the second instruction signal.

13. The method of claim 12, wherein adjusting the operation of the smart device comprises adjusting the brightness or color of a light.

14. The method of claim 13, wherein the smart device is communicatively coupled to a lighting system.

15. The method of claim 12, wherein adjusting the operation of the smart device comprises playing at least one media file selected from the group of a song stored in the memory of the smart device and a sound stored in the memory of the smart device.

16. The method of claim 15, wherein the smart device is communicatively coupled to a smart speaker.

17. The method of claim 12, wherein the card transmits a command signal to a smart device in Near-Field Communication Data Exchange Format.

18. The method of claim 12, wherein the smart device is a mobile device.

19. A gift presentation system comprising a contactless gift card, the gift card comprising a processor, a memory, and a near-field communication (NEC) circuit, wherein the memory contains an applet, presentation information, gift information, and record instruction; a television comprising a processor, a memory, a Wi-Fi antenna, and an NFC circuit configured to generate first NFC field, wherein the memory contain an application configured to perform financial transactions; and an accessory device comprising a processor, a memory, a camera, and an NFC circuit configured to generate a second NFC field, wherein, upon sensing the first NFC field, the gift card is configured to: request an authentication certificate from the television; upon receiving the authentication certificate from the television, generate a presentation message based on the presentation information and generate a gift message based on the gift information; and transmit the presentation message and gift message to the television; wherein, upon receiving the presentation message, the television transmits a first command signal to a financial institution to initiate a financial transaction; wherein upon sensing the second NFC field, the gift card is configured to: generate a record instruction signal based on the record instruction, and transmit a second command signal to the accessory device; and wherein, upon receiving the second command signal, the accessory device initiates the operation of the camera.

20. The presentation system of claim 19, wherein upon receipt of the first command signal, the television adjusts a brightness, adjusts a color, plays a song, or plays a sound.

* * * * *